(12) United States Patent
Hwang et al.

(10) Patent No.: US 9,800,996 B2
(45) Date of Patent: Oct. 24, 2017

(54) MACHINE TO MACHINE SYSTEM, METHOD AND SERVER USING SOCIAL NETWORK SERVICE

(71) Applicant: INDUSTRY FOUNDATION OF CHONNAM NATIONAL UNIVERSITY, Gwangju (KR)

(72) Inventors: Intae Hwang, Yongin-si (KR); Bora Kim, Mokpo-si (KR); Sangmi Moon, Gwangju (KR); Malik Saransh, Gwangju (KR); Chilwoo Lee, Gwangju (KR); Seungkyu Kim, Seoul (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 572 days.

(21) Appl. No.: 14/004,835

(22) PCT Filed: Dec. 24, 2012

(86) PCT No.: PCT/KR2012/011383
§ 371 (c)(1),
(2) Date: Sep. 12, 2013

(87) PCT Pub. No.: WO2014/088146
PCT Pub. Date: Jun. 12, 2014

(65) Prior Publication Data
US 2014/0297806 A1    Oct. 2, 2014

(30) Foreign Application Priority Data
Dec. 7, 2012  (KR) .................. 10-2012-0141538

(51) Int. Cl.
*H04W 4/00* (2009.01)
*H04W 4/20* (2009.01)
*H04L 29/12* (2006.01)

(52) U.S. Cl.
CPC .......... *H04W 4/005* (2013.01); *H04W 4/206* (2013.01); *H04L 61/157* (2013.01)

(58) Field of Classification Search
CPC .... H04W 4/206; H04W 4/005; H04L 61/157; H04M 3/42042
(Continued)

(56) References Cited

U.S. PATENT DOCUMENTS 8,014,801 B2 *  9/2011  Lewis ............... H04M 3/42042
                                                  370/349
8,094,666 B2 *  1/2012  Cagenius .......... H04L 29/12584
                                                  370/328
(Continued)

FOREIGN PATENT DOCUMENTS

KR       101130869 B1    3/2012
KR     1020120047683 A   5/2012
(Continued)

OTHER PUBLICATIONS

International Search Report for application No. PCT/KR2012/011383 dated Jul. 29, 2013.

*Primary Examiner* — Krista Zele
*Assistant Examiner* — Michael A Chambers
(74) *Attorney, Agent, or Firm* — Hauptman Ham, LLP (57) ABSTRACT

The present disclosure relates to a machine to machine (M2M) system, method and server using a Social Network Service (SNS). The M2M communication server receives control information of a first M2M apparatus from a second M2M apparatus that receives the control information through an SNS interface, converts the control information into a command that is recognizable by the first M2M apparatus, and transmits the command to the first M2M apparatus such that the second M2M apparatus receives information corresponding to the command. Accordingly, a human, as a user, communicates with an M2M apparatus, (Continued)

easily controls the M2M apparatus, and acquires information by use of a Social Network Service (SNS) interface that is familiar to the human.

12 Claims, 8 Drawing Sheets

(58) Field of Classification Search
USPC .......................... 370/349; 709/217, 201–207
See application file for complete search history.

(56) References Cited

U.S. PATENT DOCUMENTS

| | | | | |
|---|---|---|---|---|
| 8,312,364 | B2* | 11/2012 | Rowe | G06Q 30/02 |
| | | | | 715/205 |
| 8,819,233 | B2* | 8/2014 | Hershko | H04L 61/157 |
| | | | | 709/217 |
| 8,963,984 | B2* | 2/2015 | Brady | H04N 7/15 |
| | | | | 348/14.03 |
| 9,191,942 | B2* | 11/2015 | Kang | H04W 72/04 |
| 2002/0152325 | A1* | 10/2002 | Elgebaly | H04W 74/0808 |
| | | | | 709/245 |
| 2003/0028599 | A1* | 2/2003 | Kolsky | H04L 29/06 |
| | | | | 709/206 |
| 2004/0121764 | A1* | 6/2004 | Rivero | H04W 28/18 |
| | | | | 455/418 |
| 2008/0114955 | A1* | 5/2008 | Kitayama | G06F 3/0605 |
| | | | | 711/163 |
| 2010/0023510 | A1* | 1/2010 | Naono | G06F 17/30867 |
| | | | | 707/E17.014 |
| 2011/0154022 | A1* | 6/2011 | Cheng | H04L 63/062 |
| | | | | 713/154 |
| 2011/0193779 | A1* | 8/2011 | Williams | G06Q 10/10 |
| | | | | 345/163 |
| 2012/0078795 | A1* | 3/2012 | Mann, III | G06Q 20/04 |
| | | | | 705/44 |
| 2012/0173610 | A1* | 7/2012 | Bleau | H04L 67/26 |
| | | | | 709/203 |
| 2013/0165166 | A1* | 6/2013 | Appelman | H04L 12/581 |
| | | | | 455/466 |
| 2013/0339438 | A1* | 12/2013 | Cherian | H04W 4/005 |
| | | | | 709/204 |
| 2013/0346877 | A1* | 12/2013 | Borovoy | H04L 65/403 |
| | | | | 715/753 |
| 2014/0123228 | A1* | 5/2014 | Brill | H04L 63/1416 |
| | | | | 726/4 |

FOREIGN PATENT DOCUMENTS

| | | |
|---|---|---|
| KR | 1020120070689 A | 7/2012 |
| KR | 1020120099794 A | 9/2012 |
| KR | 101194567 B1 | 10/2012 |

\* cited by examiner

70
GPS @ IMEI . m2m

71
GPS @ 01011112222 . m2m

72
GPS @ HONG, GIL-DONG SMARTPHONE

MACHINE TO MACHINE SYSTEM, METHOD AND SERVER USING SOCIAL NETWORK SERVICE

TECHNICAL FIELD

The present disclosure relates generally to machine to machine (M2M) technology and, more particularly, to a machine to machine (M2M) system, method and server using a Social Network Service (SNS) for controlling another M2M apparatus and obtaining associated information by use of an SNS interface of a certain M2M apparatus for receiving a user's input.

BACKGROUND

With a recent development in the information and communications technologies through the development of communication devices, networks, and infrastructures, a user who is a subject performing a communication can rapidly and precisely access desired information, and also information can be exchanged between users regardless of time and location.

A communication device for information exchange has been diversified from a computer, such as a personal computer (PC) and a notebook, to a portable device, such as a cellular phone, a smartphone, and a personal digital assistant (PDA), and is developed to the level where a communication is achieved by use of an electronic home appliance, such as a smart television.

In recent years, machine to machine (M2M) technology that refers to a communication scheme between machines while having a machine as a subject performing a communication has been developed. Such an M2M is understood as a communication scheme including a voltage converter remote monitor, an electricity and gas meter remote check, a wireless credit card check, a wireless security terminal, a bus management system, a position tracking system, and a building management interacted with one another in an integrated manner.

In addition, the M2M can be defined as a concept including a communication between a machine and a human or a third party communication between a human and multiple machines (including a server or a terminal), besides the communication between machines.

However, the M2M communication between machines is achieved by exchanging information through a predetermined communication protocol, and thus causes a difficulty for a human to intuitively identify the M2M apparatus, and a difficulty for a human to understand the contents of the exchanged information.

Such difficulties serve as a constraint limiting the expandability when including a human, as well as a machine, as a subject performing an M2M communication, and require an additional apparatus to be constructed for a communication with a human, thereby costing additional expense.

SUMMARY

The present disclosure provides a machine to machine (M2M) system, method and server capable of adding a human, as well as a machine, as a subject to perform an M2M communication, and enabling a human to control a certain M2M apparatus and acquire information using a Social Network Service (SNS) interface that is familiar to the human.

In accordance with some embodiments, a machine to machine (M2M) communication method includes receiving, by an M2M communication server, control information of a first M2M apparatus from a second M2M apparatus that receives the control information through an SNS interface, by use of identification information of the first M2M apparatus; converting, by the M2M communication server, the control information into a command that is recognizable by the first M2M apparatus, and transmitting the command to the first M2M apparatus by use of the identification information; and receiving, by the M2M communication server, information corresponding to the command from the first M2M apparatus, and transmitting the information to the second M2M apparatus.

In accordance with some embodiments, a machine to machine (M2M) communication method includes receiving, by an M2M communication server, an alias corresponding to identification information of a first M2M apparatus from the first M2M apparatus or a second M2M apparatus, and registering the received alias therein; receiving, by the M2M communication server, control information of the first M2M apparatus from the second M2M apparatus that receives the control information through an SNS interface, by use of the alias; converting, by the M2M communication server, the control information into a command that is recognizable by the first M2M apparatus, and by referring to the identification information corresponding to the alias, transmitting the command to the first M2M apparatus by use of the identification information; and receiving, by the M2M communication server, information corresponding to the command from the first M2M apparatus, and transmitting the information to the second M2M apparatus.

The control information is provided in the form of a text or a speech.

In a case in which the first M2M apparatus is connected to an access point, the identification information includes at least one piece of information of domain information for an M2M communication, an identifier of the access point, information representing a connection scheme of the first M2M apparatus and the access point, and a Media Access Control (MAC) address of the first M2M apparatus.

In a case in which the first M2M apparatus belongs to a terminal, the identification information includes at least one piece of information of domain information for an M2M communication, an identifier of the terminal, and an identifier of the first M2M apparatus.

The identifier of the terminal includes an International Mobile Equipment Identity (IMEI), an International Mobile Subscriber Identity (IMSI), an Integrated Circuit Card Identifier (ICCID), a Mobile Equipment IDentifier (MEID) or an Electronic Serial Number (ESN).

In transmitting the information to the second M2M apparatus, the M2M communication server converts the information corresponding to the command into information that is recognizable through an SNS interface of the second M2M apparatus, and transmits the converted information to the second M2M apparatus.

The alias is provided in the form of a text that is visually recognized.

In accordance with some embodiments, an M2M communication system using a Social Network Service (SNS) includes a first M2M apparatus, a second M2M apparatus, and an M2M communication server. The first M2M apparatus, upon receiving a command by use of identification information of the first M2M apparatus, is configured to transmit information corresponding to the command. The second M2M apparatus, upon receiving control information of the first M2M apparatus through an SNS interface, is configured to transmit the control information by use of the identification information, and receive information corresponding to the command and output the received information. The M2M communication server, upon receiving the control information from the second M2M apparatus by use of the identification information, is configured to convert the control information into a command that is recognizable by the first M2M apparatus, transmit the command to the first M2M apparatus by use of the identification information, receive information corresponding to the command from the first M2M apparatus, and transmit the received information to the second M2M apparatus.

In accordance with some embodiments, an M2M communication system using a Social Network Service (SNS) includes a first M2M apparatus, a second M2M apparatus, and an M2M communication server. The first M2M apparatus, upon receiving a command by use of identification information of the first M2M apparatus, is configured to transmit information corresponding to the command. The second M2M apparatus, upon receiving control information of the first M2M apparatus through an SNS interface, is configured to transmit the control information by use of an alias corresponding to the identification information, and receive information corresponding to the command and output the received information. The M2M communication server is configured to receive the alias corresponding to the identification information from the first M2M apparatus or the second M2M apparatus, and register the received alias therein, and upon receiving the control information from the second M2M apparatus by use of the alias, is configured to convert the control information into a command that is recognizable by the first M2M apparatus, transmit the command to the first M2M apparatus by use of the identification information in a way to refer to the identification information corresponding to the alias, receive information corresponding to the command from the first M2M apparatus, and transmit the received information to the second M2M apparatus.

In accordance with some embodiments, a machine to machine (M2M) communication server using a Social Network Service (SNS) includes a communication module, a conversion module, and a control module. The communication module is configured to transmit and receive data. The conversion module is configured to convert control information of a first M2M apparatus into a command that is recognizable by the first M2M apparatus. The control module, upon receiving the control information through the communication module by use of identification information of the first M2M apparatus from a second M2M apparatus that receives the control information through an SNS interface, is configured to control the conversion module to covert the control information into the command, transmit the command to the first M2M apparatus through the communication module by use of the identification information, receive information corresponding to the command from the first M2M apparatus through the communication module, and transmit the received information to the second M2M apparatus.

In accordance with some embodiments, a machine to machine (M2M) communication server using a Social Network Service (SNS) includes a communication module, a registration module, a conversion module, and a control module. The communication module is configured to transmit and receive data. The registration module is configured to register identification information for an M2M communication of a first M2M apparatus and an alias corresponding to the identification information. The conversion module is configured to convert control information of the first M2M apparatus into a command that is recognizable by the first M2M apparatus. The control module is configured to receive the identification information and the alias through the communication module and control the registration module to register the identification information and the alias, and upon receiving the control information through the communication module by use of the alias from a second M2M apparatus that receives the control information through an SNS interface, is configured to control the conversion module to covert the control information into the command, transmit the command to the first M2M apparatus through the communication module by use of the identification information by referring to the identification information corresponding to the alias in the registration module, receive information corresponding to the command from the first M2M apparatus through the communication module, and transmit the received information to the second M2M apparatus.

The control information is provided in the form of a text or a speech.

In a case in which the first M2M apparatus is connected to an access point, the identification information includes at least one piece of information of domain information for an M2M communication, an identifier of the access point, information representing a connection scheme of the first M2M apparatus and the access point, and a Media Access Control (MAC) address of the first M2M apparatus.

In a case in which the first M2M apparatus belongs to a terminal, the identification information includes at least one piece of information of domain information for an M2M communication, an identifier of the terminal, and an identifier of the first M2M apparatus.

The identifier of the terminal includes an International Mobile Equipment Identity (IMEI), an International Mobile Subscriber Identity (IMSI), an Integrated Circuit Card IDentifier (ICCID), a Mobile Equipment IDentifier (MEID) or an Electronic Serial Number (ESN).

The conversion module further performs a function to convert certain information into information that is recognizable through an SNS interface, and the control module controls the conversion module to convert the information corresponding to the command, which has been received from the first M2M apparatus, into information recognizable through an SNS interface of the second M2M apparatus, and directly transmits the converted information to the second M2M apparatus.

The alias is provided in the form of a text that is visually recognized.

In accordance with some embodiments, a computer readable recording medium that records a program executing the M2M communication method is provided.

As is apparent from the above, the M2M system and method using an SNS and the server therefor can provide following effects.

First, a human, as a user, can communicate with an M2M apparatus by use of an SNS interface that is familiar to the user, and through such, can easily control the M2M apparatus and acquire information.

Second, an additional cost is minimized when a user is included as a subject of an M2M communication, and superior expandability is ensured.

Third, a user can proceed with a control operation and an information acquisition process by recognizing each M2M apparatus as an independent entity, while assigning an alias to the M2M apparatus to individually recognize each M2M apparatus.

DETAILED DESCRIPTION

In the following description, numerous specific details are set forth. However, it is understood that various embodiments of the disclosure are practiced without these specific details. In other instances, well-known functions or configurations have not been shown in detail in order not to obscure understanding of this description. The terminology used herein is defined by considering a function in the embodiments, and meanings may vary depending on, for example, a user or operator's intentions or customs. Therefore, the meanings of terms used in the embodiments should be interpreted based on the scope throughout this specification. The same reference numbers will be used throughout this specification to refer to the same or like parts.

The present disclosure relates to technology for performing a control operation on another M2M apparatus or acquiring information, by use of a certain M2M apparatus provided with a Social Network Service (SNS) program. Hereinafter, embodiments of the present disclosure will be described in detail with reference to accompanied drawings.

Figure 1:
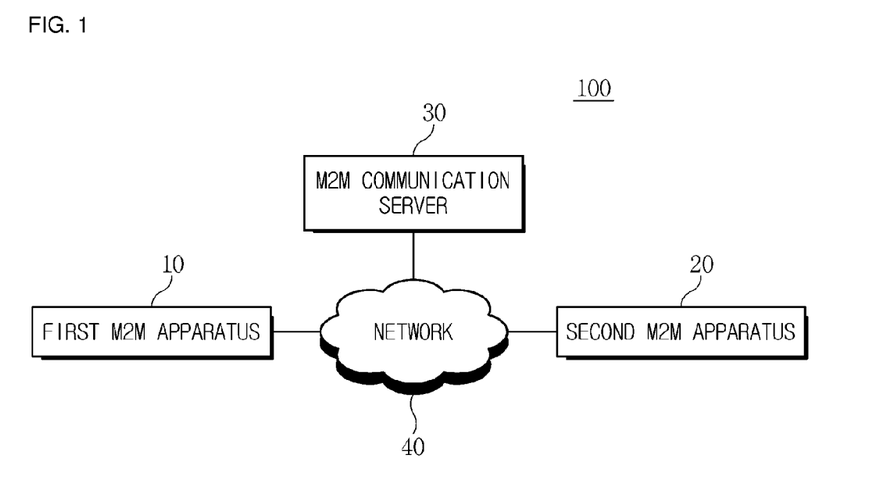
FIG. 1 is a block diagram illustrating an M2M system in accordance with an embodiment of the present disclosure.

FIG. 1 is a block diagram illustrating an M2M system in accordance with an embodiment of the present disclosure.

Referring to FIG. 1, a machine to machine (M2M) communication system 100 in accordance with an embodiment includes a first M2M apparatus 10, a second M2M apparatus 20, an M2M communication server 30, and a network 40.

The network 40 represents a communication network for data transmission/reception or information exchange among the first M2M apparatus 10, the second M2M apparatus 20, and the M2M communication server 30.

The network 40 in accordance with the present disclosure supports a communication protocol enabling an M2M communication and a relevant interface, and to this end, includes a wired network, a wireless network, and a combination thereof.

The first M2M apparatus 10 and the second M2M apparatus 20 are devices that exchange information between each other through an M2M communication. The first M2M apparatus 10 and the second M2M apparatus 20 may be various sensors, terminals, and machines having a communication interface for an M2M communication.

The M2M communication represents a converged infrastructure of future information and communication technology that enables an intelligence communication service of 'a machine to a machine' or 'a machine to a human' to be used in real time regardless of the time and the place in a safe and convenient manner. In the M2M communication, various devices are combined with a communication function, so that information is collected in an intelligent manner and delivered between devices while enabling context recognition, position information determination, and a remote control.

In accordance with the present disclosure, the first M2M apparatus 10 or the second M2M apparatus 20 is provided with a Social Network Service (SNS) program for providing a human interface.

In general, the SNS program enables a relation with an unspecified stranger online, and also is utilized to exchange information, such as a text and an image, between a human and a human. However, in accordance with the present disclosure, a user controls another M2M apparatus by use of an SNS program interface of a terminal belonging to the user, and acquires information. For example, the second M2M apparatus 20 may be a user terminal, and the user may control the first M2M apparatus 10 or acquire information from the first M2M apparatus 10 by use of an SNS program interface provided on the second M2M apparatus 20.

The M2M communication server 30 is an apparatus relaying an M2M communication between the first M2M apparatus 10 and the second M2M apparatus 20. That is, the M2M communication server 30 performs a supporting function such that the first M2M apparatus 10 and the second M2M apparatus 20 exchange various pieces of information between each other. The M2M communication server 30 is referred to as a type of a server apparatus, but is not limited thereto. The M2M communication server may be embodied as any other apparatus that can perform functions of the present disclosure.

In the conventional M2M communication technology, a management server for an M2M communication is additionally constructed, and a terminal having a certain program installed thereon controls an M2M apparatus through the management server. Such a conventional technology leads to extra costs occurring from constructing the additional server, and also requires a specific program for the M2M communication, thereby having a poor expandability in supporting the M2M communication in various M2M apparatuses.

Meanwhile, the M2M communication server 30 in accordance with the present disclosure is not a server that is additionally provided for an M2M communication between the first M2M apparatus 10 and the second M2M apparatus 20, but a server apparatus relaying an M2M communication while relaying an SNS.

That is, the M2M communication server 30 not only provides the first M2M apparatus 10 or the second M2M apparatus 20 with an SNS service, but also, by use of an SNS interface of one of the first M2M apparatus 10 and the second M2M apparatus 20, receives control information of the other M2M apparatus 10 or 20 to achieve an M2M communication.

In accordance with an embodiment of the present disclosure, if the second M2M apparatus 20 receives information for controlling the first M2M apparatus 10 from a user through an SNS interface, the second M2M apparatus 20 transmits the control information to the M2M communication server 30 by use of identification information of the first M2M apparatus 10. In this case, the control information input through the SNS interface of the second M2M apparatus 20 may be text or speech type information. In a case in which the second M2M apparatus 20 receives control information in the form of a speech, the second M2M apparatus 20 may recognize the speech and convert the speech into a text.

In this case, the second M2M apparatus 20 receives identification information of the first M2M apparatus 10 that is previously registered in the M2M communication server 30, and utilizes the identification information to transmit the information for controlling the first M2M apparatus 10. In addition, the second M2M apparatus 20 may receive identification information of the first M2M apparatus 10 from a user, or allow previously stored identification information to be selected by a user, to utilize the identification information in transmitting the information for controlling the first M2M apparatus. In this case, the identification information of the first M2M apparatus 10 may include logical address information or physical address information of the first M2M apparatus 10 for an M2M communication.

For example, in a case in which the first M2M apparatus 10 is connected to an additional access point for an M2M communication, identification information of the first M2M apparatus 10 used for the M2M communication may include at least one piece of information of domain information for an M2M communication, an identifier of the access point, information representing a connection scheme of the first M2M apparatus 10 and the access point, and a Media Access Control (MAC) address of the first M2M apparatus 10.

In this case, the access point to which the first M2M apparatus 10 is connected needs to be construed as a concept including various concepts of network access equipment, such as an access point, a router, a gateway, and a repeater.

In addition, in a case in which the first M2M apparatus 10 belongs to a certain terminal, identification information of the first M2M apparatus 10 utilized for an M2M communication may include at least one piece of information of domain information for an M2M communication, an identifier of the terminal, and an identifier of the first M2M apparatus 10.

In this case, the identifier of the terminal to which the first M2M apparatus 10 belongs may include information such as an International Mobile Equipment Identity (IMEI), an International Mobile Subscriber Identity (IMSI), an Integrated Circuit Card IDentifier (ICCID), a Mobile Equipment IDentifier (MEID) or an Electronic Serial Number (ESN).

The M2M communication server 30 having received the control information from the second M2M apparatus 20 converts the control information into a command that is recognized by the first M2M apparatus 10. That is, the control information received by the second M2M apparatus 20 through the SNS interface is composed of a format recognized by a human, rather than a format recognized by the first M2M apparatus 10. Accordingly, the M2M communication server 30 converts the control information into a command having a format recognized by the first M2M apparatus 10.

In addition, the M2M communication server 30 transmits the converted command to the first M2M apparatus 10 by use of the identification information of the first M2M apparatus 10.

The first M2M apparatus 10 having received the command from the M2M communication server 30 executes the command by interpreting the command, and transmits information corresponding to the command to the M2M communication server 30. For example, in a case in which the first M2M apparatus 10 includes a sensor apparatus, the command may be a command instructing to sense a context by use of a sensor, and provide sensed information.

The M2M communication server 30 having received the information corresponding to the command from the first M2M apparatus 10 may transmit the received information to the second M2M apparatus 20 such that a user checks the information. In this case, the M2M communication server 30 may convert the information received from the first M2M apparatus 10 into information that is recognizable through the SNS interface of the second M2M apparatus 20, and transmit the converted information to the second M2M apparatus 20.

In accordance with another embodiment of the present disclosure, the M2M communication server 30 may receive an alias corresponding to identification information of the first M2M apparatus 10 from the first M2M apparatus 10 or the second M2M apparatus 20, and register the alias therein, to provide the first M2M apparatus 10 with an M2M service. In this case, the identification information of the first M2M apparatus 10 may include logical address information or physical address information of the first M2M apparatus 10 for an M2M communication, and the alias may represent another name assigned for a user of the first M2M apparatus 10 or a user of the second M2M apparatus 20 to easily recognize the identification information. Similar to setting a user name corresponding to a phone number when storing a phone book on a smartphone, an alias corresponding to identification information is set by a user and transmitted to be registered, and provided in a text type.

Thereafter, the second M2M apparatus 20, upon receiving information for controlling the first M2M apparatus 10 from a user through the SNS interface, transmits the control information to the M2M communication server 30 by use of the alias of the first M2M apparatus 10. In this case, the control information input through the SNS interface of the second M2M apparatus 20 may be provided in the form of a text or a speech. In a case in which the second M2M apparatus 20 receives control information in the form of a speech, the second M2M apparatus 20 may recognize the corresponding speech and convert the speech into a text.

In this case, the second M2M apparatus 20 receives an alias of the first M2M apparatus 10 that is previously registered in the M2M communication server 30, and utilizes the additional information to transmit the information for controlling the first M2M apparatus 10. In addition, the second M2M apparatus 20 may receive an alias of the first M2M apparatus 10 from a user, or allow a previously stored alias to be selected by a user, to utilize the alias in transmitting the control information.

The M2M communication server 30 having received the control information from the second M2M apparatus 20 converts the control information into a command that is recognizable by the first M2M apparatus 10. That is, the control information received by the second M2M apparatus 20 through the SNS interface is composed of a format recognized by a human, rather than a format recognized by the first M2M apparatus 10. Accordingly, the M2M communication server 30 converts the control information into a command having a format recognized by the first M2M apparatus 10.

In addition, the M2M communication server 30, by use of the alias received from the second M2M apparatus 20, refers to identification information of the first M2M apparatus 10 corresponding to the alias, and transmits the command by use of the referred identification information to the first M2M. That is, the identification information of the first M2M apparatus 10 for an M2M communication and the alias corresponding to the identification information are previously registered in the M2M communication server 30, and the M2M communication server 30, if the M2M communication server 30 receives information regarding the alias from the second M2M apparatus 20, refers to a corresponding identification information by use of the alias, and utilizes the identification information in transmitting the command.

The first M2M apparatus 10 having received the command from the M2M communication server 30 executes the command by interpreting the command, and transmits information corresponding to the command to the M2M communication server 30.

The M2M communication server 30 having received the information corresponding to the command from the first M2M apparatus 10 may transmit the received information to the second M2M apparatus 20 such that a user checks the information. In this case, the M2M communication server 30 may convert the information received from the first M2M apparatus 10 to information that is recognizable through the SNS interface of the second M2M apparatus 20, and transmit the converted information to the second M2M apparatus 20.

In a case in which the first M2M apparatus 10 is connected to an additional access point for an M2M communication, identification information of the first M2M apparatus 10 used for the M2M communication may include at least one piece of information of domain information for an M2M communication, an identifier of the access point, information representing a connection scheme of the first M2M apparatus 10 and the access point, and a Media Access Control (MAC) address of the first M2M apparatus 10. In this case, the access point to which the first M2M apparatus 10 is connected needs to be construed as a concept including various concepts of network access equipment, such as an access point, a router, a gateway, and a repeater.

In addition, in a case in which the first M2M apparatus 10 belongs to a certain terminal, identification information of the first M2M apparatus 10 utilized for an M2M communication may include at least one piece of information of domain information for an M2M communication, an identifier of the terminal, and an identifier of the first M2M apparatus 10. In this case, the identifier of the terminal to which the first M2M apparatus 10 belongs may include information such as an IMEI, an IMSI, an ICCID, an MEID, or an ESN.

Hereinafter, the functionalities and operations of the M2M communication server 30 providing a support to perform the M2M communication by use of an SNS in accordance with the present disclosure will be described in detail with reference to FIG. 2.

Figure 2:
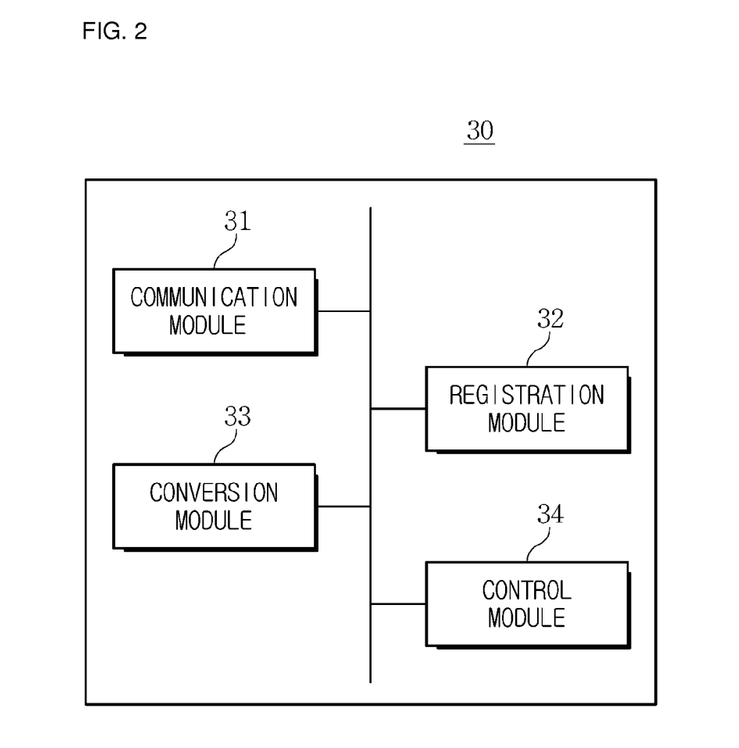
FIG. 2 is a block diagram illustrating an M2M communication server in accordance with an embodiment of the present disclosure.

FIG. 2 is a block diagram illustrating an M2M system in accordance with an embodiment of the present disclosure.

Referring to FIGS. 1 and 2, the M2M communication server 30 shown in FIG. 2 includes a communication module 31, a registration module 32, a conversion module 33 and a control module 34. Each component of the M2M communication server 30 shown in FIG. 2 may be embodied in a physically unitary device, or one or more component of the M2M may be physically separated into several components and provided in different devices.

The communication module 31 serves to transmit and receive data through the network 40, and includes a communication interface.

The registration module 32 serves to register identification information for an M2M communication of the first M2M apparatus 10 or an alias corresponding to the identification information, and may include a data storage therefor.

In this case, the identification information of the first M2M apparatus 10 may include logical address information or physical address information that is registered in the registration module 32 when the first M2M apparatus 10 is registered as an M2M apparatus. In addition, the alias corresponding to the identification information of the first M2M 10 may be information that is registered by a user of the first M2M apparatus 10 or a user of the second M2M apparatus 20 by use of the first M2M apparatus 10 and the second M2M apparatus 20 in the form of a text.

For example, in a case in which the first M2M apparatus 10 is connected to an additional access point for an M2M communication, identification information of the first M2M apparatus 10 used for the M2M communication may include at least one piece of information of domain information for an M2M communication, an identifier of the access point, information representing a connection scheme of the first M2M apparatus 10 and the access point, and a Media Access Control (MAC) address of the first M2M apparatus 10.

In this case, the access point to which the first M2M apparatus 10 is connected needs to be construed as a concept including various concepts of network access equipment, such as an access point, a router, a gateway, and a repeater.

In addition, in a case in which the first M2M apparatus 10 belongs to a certain terminal, identification information of the first M2M apparatus 10 utilized for an M2M communication may include at least one piece of information of domain information for an M2M communication, an identifier of the terminal, and an identifier of the first M2M apparatus 10.

In this case, the identifier of the terminal to which the first M2M apparatus 10 belongs may include information such as an IMEI, an IMSI, an ICCID, an MEID, or an ESN.

The conversion module 33 serves to convert control information for controlling the first M2M apparatus 10 into a command that is recognizable by the first M2M apparatus 10, and for such, may include an operation unit or an application program storage.

The control module 34 serves to control overall operations of the M2M communication server 30 including the communication module 31, the registration module 32, and the conversion module 33, and for such, may include a processor or an application program storage.

In accordance with an embodiment of the present disclosure, the second M2M apparatus 20 receives text or speech type control information for controlling the first M2M apparatus 10 through the SNS interface, and according to transmission by the second M2M apparatus 20, the control module 34 receives the control information through the communication module 31. In this case, the second M2M apparatus 20 may transmit the control information of the first M2M apparatus 10 by use of identification information of the first M2M apparatus 10 or an alias corresponding to identification information, and the control module 34 may transmit identification information of the first M2M apparatus 10 or an alias corresponding to the identification information, which is registered in the registration module 32, to the second M2M apparatus 20 through the communication module 31 such that the identification information or the alias is utilized for an M2M communication.

In addition, the control module 34 controls the conversion module 33 to convert the received control information into a command that is recognizable by the first M2M apparatus 10. That is, the control information received by the second M2M apparatus 20 through the SNS interface is composed of a format recognized by a human, rather than a format recognized by the first M2M apparatus 10. Accordingly, the control module 34 controls the conversion module 33 to convert the received control information into a command having a format recognized by the first M2M apparatus 10.

In addition, the control module 34 transmits the command, which is converted by the conversion module 33, to the first M2M apparatus 10 by use of the identification information of the first M2M apparatus 10. In a case in which the control information of the first M2M apparatus has been received by use of an alias corresponding to identification information of the first M2M apparatus 10, the control module 34 may refer to the identification information corresponding to the alias in the registration module 32, and utilize the referred identification information in transmitting the control information.

Thereafter, the control module 34 receives information corresponding to the command from the first M2M apparatus 10 through the communication module 31, and transmits the received information to the second M2M apparatus 20 through the communication module 31 such that a user checks the information.

In this case, the conversion module 33 may convert the information received from the first M2M apparatus 10 into information that is recognizable through the SNS interface of the second M2M apparatus 20, and the control module 34 may control the conversion module 33 to convert the information received from the first M2M apparatus 10, and may transmit the converted information to the second M2M apparatus 20.

Hereinafter, the configuration of identification information used for an M2M communication or an alias corresponding to the identification information in accordance with the present disclosure will be described in detail with reference to FIGS. 3 to 5.

Figure 3:
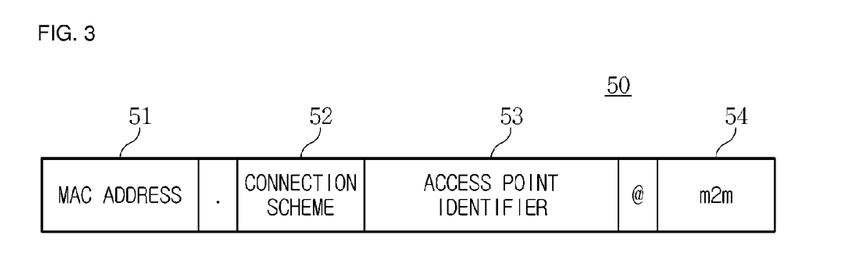
FIG. 3 is a diagram illustrating identification information in accordance with an embodiment of the present disclosure.
Figure 4:
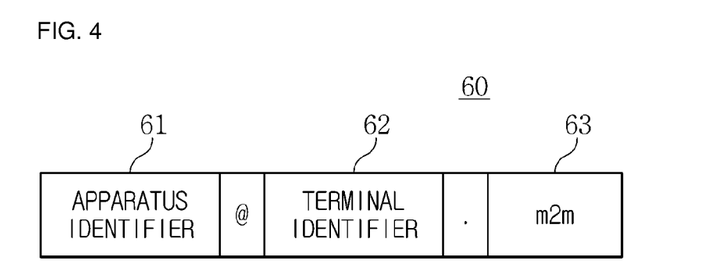
FIG. 4 is a diagram illustrating identification information in accordance with another embodiment of the present disclosure.
Figure 5:
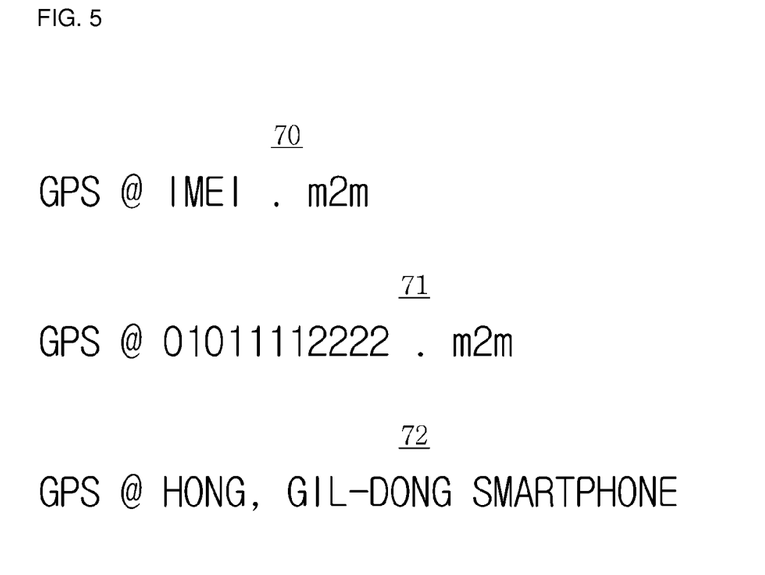
FIG. 5 is a diagram illustrating identification information and an alias in accordance with an embodiment of the present disclosure.

FIG. 3 is a diagram illustrating identification information 50 in accordance with an embodiment of the present disclosure, FIG. 4 is a diagram illustrating identification information 60 in accordance with another embodiment of the present disclosure, and FIG. 5 is a diagram illustrating identification information 70 and aliases 71 and 72 in accordance with an embodiment of the present disclosure.

The identification information 50, 60, and 70 shown in FIGS. 3 to 5 include a logical address or a physical address that is used to identify the M2M apparatus 10 when the first M2M apparatus 10 joins an M2M communication.

In addition, the aliases 71 and 72 shown in FIG. 5 include text-type alias information that is set by a user of the first M2M apparatus 10 or a user of the second M2M apparatus 20 so as to correspond to the identification information 70, and registered in the M2M communication server 30.

The identification information 50 in FIG. 3 represents recognition information in a case in which the first M2M apparatus 10 is connected to an additional access point for an M2M communication, and in this case, the access point needs to be construed as a concept including various concepts of network access equipment, such as an access point, a router, a gateway, and a repeater.

On FIG. 3, the identification information 50 includes a Media Access Control (MAC) address 51, a connection scheme 52, an access point identifier 53, domain (m2m) information 54 for an M2M communication, and a delimiter, such as '.', '@'.

The MAC address 51 includes a physical address of the first M2M apparatus 10 for an M2M communication.

The connection scheme 52 includes communication scheme information about connecting the first M2M apparatus 10 to the access point.

The access point identifier 53 includes identifier information of the access point to which the first M2M apparatus 10 is connected for an M2M communication.

The domain information 54 for an M2M communication indicates that the identification information of the first M2M apparatus 10 corresponds to the M2M communication.

The identification information 60 in FIG. 4 represents recognition information in a case in which the first M2M apparatus 10 belongs to a terminal that performs an M2M communication, and in this case, the terminal represents various terminals, such as a cellular phone, a smartphone, a computer, a notebook, a personal digital assistant (PDA), and an electronic home appliance.

The identification information 60 in FIG. 4 includes an apparatus identifier 61, a terminal identifier 62, domain (m2m) information 63 for an M2M communication, and a delimiter, such as '.', '@'.

The apparatus identifier 61 includes identifier information identifying the first M2M apparatus 10 included in a certain terminal.

The terminal identifier 62 includes identifier information of a terminal to which the first M2M apparatus 10 belongs.

In this case, the terminal identifier 62 may include information, such as an IMEI, an IMSI, an ICCID, an MEID, or an ESN, depending on the type of the terminal.

The domain information 63 for an M2M communication indicates that the identification information of the first M2M apparatus 10 corresponds to the M2M communication.

The identification information 70 in FIG. 5 represents recognition information in a case in which the first M2M apparatus 10 is a Global Positioning System (GPS) apparatus, and the first M2M apparatus 10 belongs to a terminal, such as a smartphone.

On FIG. 5, the identification information 70 includes an identifier indicating that the first M2M apparatus 10 is a GPS apparatus, and International Mobile Equipment Identity (IMEI) identifying a terminal to which the first M2M apparatus 10 belongs, and domain information for an M2M communication.

In this case, the identification information, such as IMEI, included in the identification information 70 is difficult for a user to intuitively recognize. Accordingly, a user of the first M2M apparatus 10 or a user of the second M2M apparatus 20 sets the aliases 71 and 72 corresponding to the identification information 70, and utilizes the aliases 71 and 72 for performing the M2M communication.

The alias 71 is set by changing the IMEI information included in the identification information 70 into phone number information '01011112222' that is easily recognized by a user.

In addition, the alias 72 is set by using a text 'Hong, gil-dong Smartphone' determined by a user instead of using the IMEI information and the M2M domain information included in the identification information 70.

In this manner, the user of the first M2M apparatus 10 or the user of the second M2M apparatus 20 sets the alias of the first M2M apparatus 10 that is easy for the user to utilize the alias.

Hereinafter, an example of implementation of the SNS interface used in the M2M communication in accordance with the present disclosure will be described in detail with reference to FIGS. 6 and 7.

Figure 6:
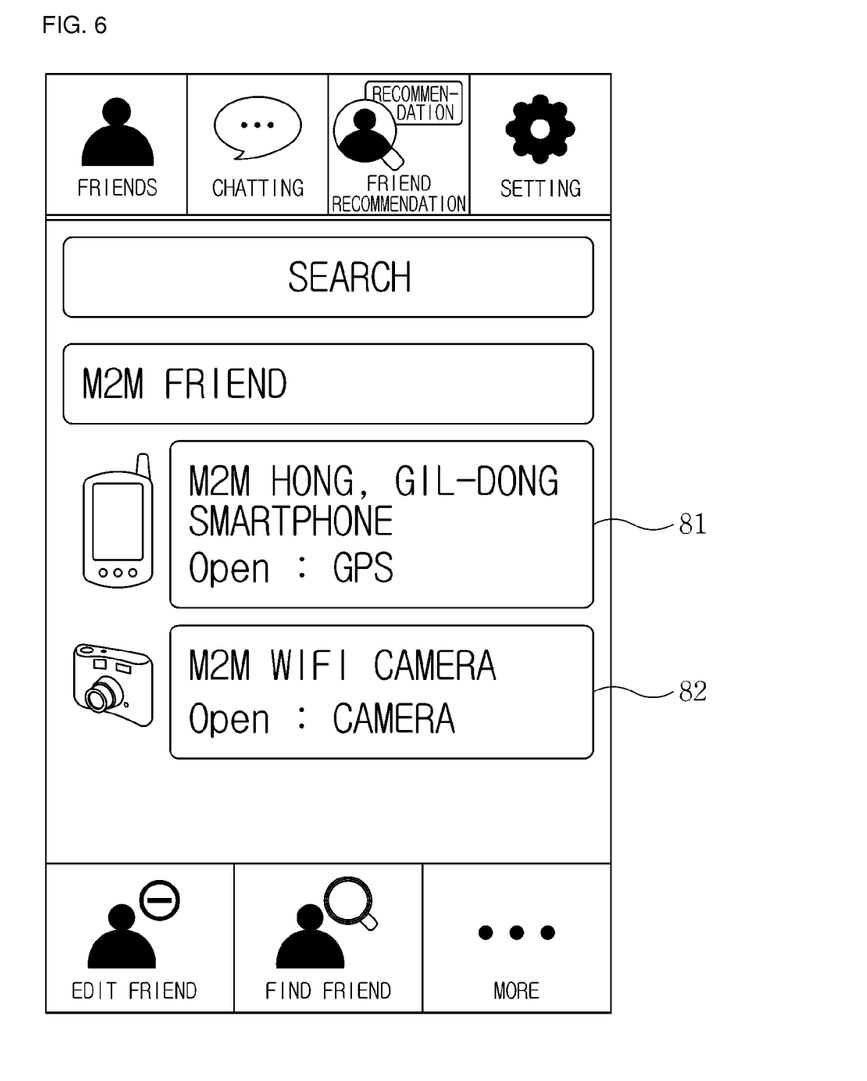
FIGS. 6 and 7 are screenshots illustrating examples of an SNS interface in accordance with embodiments of the present disclosure.
Figure 7:
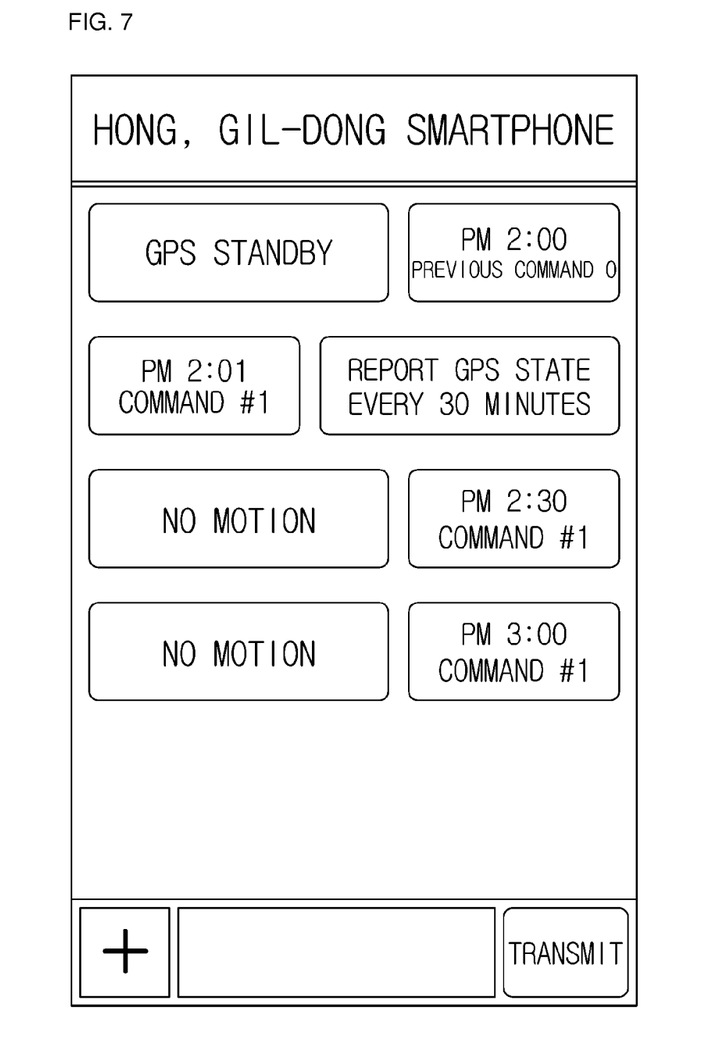

FIGS. 6 and 7 are screenshots illustrating examples of an SNS interface in accordance with embodiment of the present disclosure.

FIGS. 6 and 7 represent an example of an operation screen of controlling the first M2M apparatus 10 by use of the SNS interface of the second M2M apparatus 20 shown in FIG. 1.

Referring to FIG. 6, as the SNS program is executed by manipulating the second M2M apparatus 20, a screen shown on FIG. 6 is output.

On the SNS interface shown in FIG. 6, various menus are located at an upper part and a lower part to perform a chatting with friends, and referring to the center of the screen, it is known that a 'Hong, gil-dong Smartphone 81' and a 'camera 82 connected through WIFI' are present as an apparatus to perform an M2M communication.

In this case, the second M2M apparatus 20 is in a state of capable of performing an M2M communication with a GPS apparatus included in the 'Hong, gil-dong Smartphone 81', and capable of performing an M2M communication with a camera apparatus of the 'camera 82 connected through WIFI'.

In this case, if a user touches the 'Hong, gil-dong Smartphone 81', a window to control the 'Hong, gil-dong Smartphone 81' is output as shown in FIG. 7, and the GPS apparatus enters a standby mode to receive a control command, starting from 2 o'clock (2 pm).

In addition, if a user inputs control information noting 'report a GPS state every 30 minutes' at 2:01 pm to control the GPS apparatus, a command corresponding to the control information is transmitted to the first M2M apparatus 10 through the M2M communication server 30 shown in FIG. 1.

Thereafter, according to the command for the first M2M communication server 30, the GPS of the 'Hong, gil-dong Smartphone 81' measures the position every 30 minutes, that is, at 2:30 pm and 3 pm, and transmits information indicating 'there is no motion' as a result of the measurement, and the information is transmitted to the second M2M apparatus 20 via the M2M communication server 30 and output as shown in FIG. 7.

Hereinafter, a process of performing an M2M communication using an SNS interface will be described in detail with reference to FIGS. 8 and 9.

Figure 8:
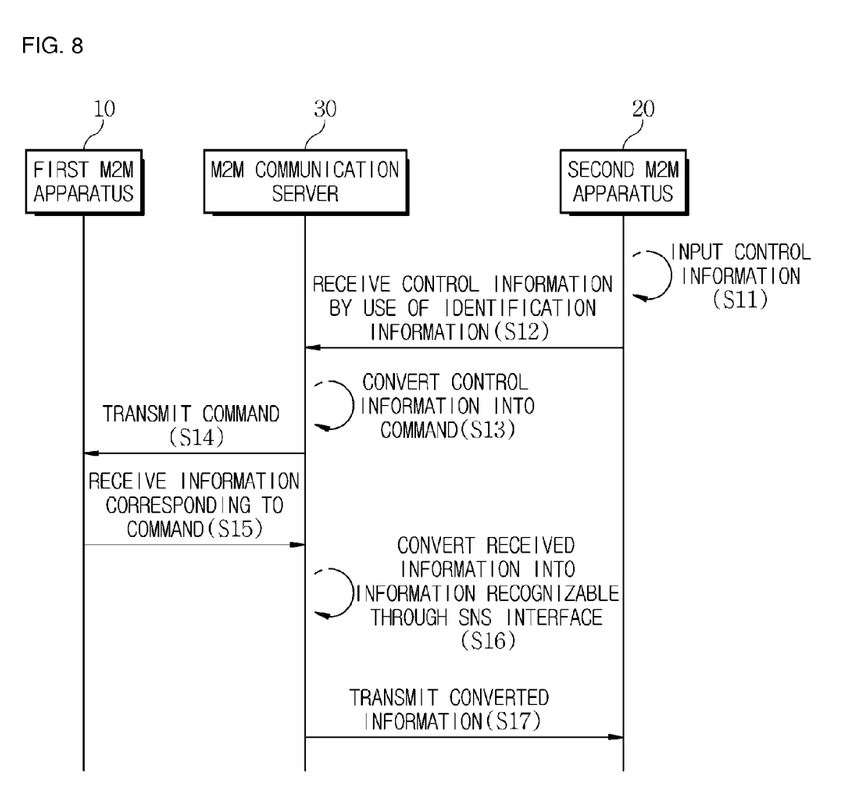
FIG. 8 is a flowchart showing an M2M process in accordance with an embodiment of the present disclosure.

FIG. 8 is a flowchart showing an M2M process in accordance with an embodiment of the present disclosure.

Referring to FIG. 8, the second M2M apparatus 20 receives a text or speech type control information to control the first M2M apparatus 10, by use of the SNS program interface (step S11).

The second M2M apparatus 20 transmits the control information of the first M2M apparatus 10 by use of identification information of the first M2M apparatus 10, and the M2M communication server 30 receives the control information (step S12).

In this case, the identification information of the first M2M apparatus 10 includes a logical address or a physical address of the first M2M apparatus 10 for an M2M communication.

For example, in a case in which the first M2M apparatus 10 is connected to an additional access point for an M2M communication, identification information of the first M2M apparatus 10 used for the M2M communication may include at least one piece of information of domain information for an M2M communication, an identifier of the access point, information representing a connection scheme of the first M2M apparatus 10 and the access point, and a Media Access Control (MAC) address of the first M2M apparatus 10.

In this case, the access point to which the first M2M apparatus 10 is connected needs to be construed as a concept including various concepts of network access equipment, such as an access point, a router, a gateway, and a repeater.

In addition, in a case in which the first M2M apparatus 10 belongs to a certain terminal, identification information of the first M2M apparatus 10 utilized for an M2M communication may include at least one piece of information of domain information for an M2M communication, an identifier of the terminal, and an identifier of the first M2M apparatus 10. In this case, the identifier of the terminal to which the first M2M apparatus 10 belongs may include information such as an IMEI, an IMSI, an ICCID, an MEID, or an ESN.

The M2M communication server 30, having received the control information of the first M2M apparatus 10 from the second M2M apparatus 20 in step S12, converts the control information into a command that is recognizable by the first M2M apparatus 10 (step S13).

In general, the control information received by the second M2M apparatus 20 through the SNS interface is composed of a format recognized by a human, rather than a format recognized by the first M2M apparatus 10. Accordingly, in step S13, the M2M communication server 30 converts the control information into a command having a format recognized by the first M2M apparatus 10.

The M2M communication server 30 transmits the converted command to the first M2M apparatus 10 by use of the identification information of the first M2M apparatus 10 (step S14), and at a later time, the M2M communication server 30 receives information corresponding to the command from the first M2M apparatus 10 (step S15).

The information received by the M2M communication server 30 in step S15 may be information that is provided by the first M2M apparatus 10 according to a command instructing to sense a context by use of a sensor, and provide sensed information.

The M2M communication server 30 having received the information corresponding to the command in step S15 converts the information into information that is recognizable through an SNS interface of the second M2M apparatus 20 (step S16), and transmits the converted information to the second M2M apparatus 20 such that the information is output (step S17).

Figure 9:
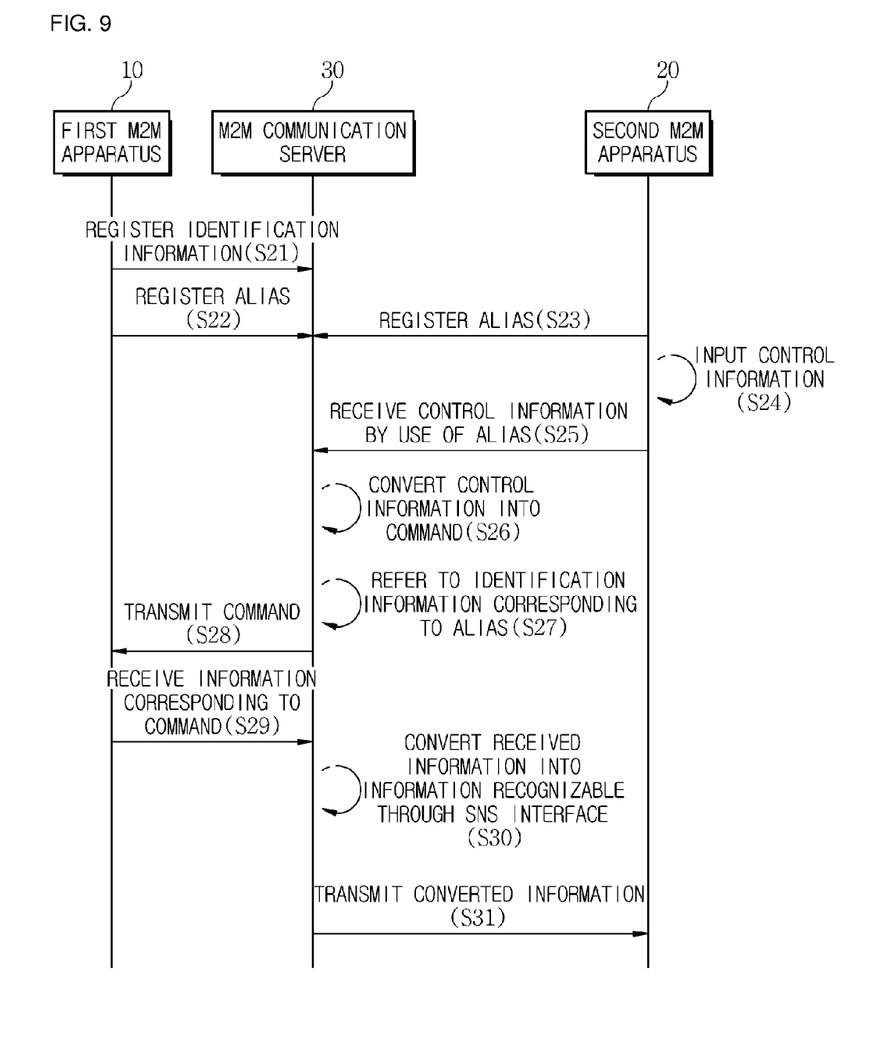
FIG. 9 is a flowchart showing an M2M process in accordance with another embodiment of the present disclosure.

FIG. 9 is a flowchart showing an M2M process in accordance with another embodiment of the present disclosure.

Referring to FIG. 9, the M2M communication server 30 providing an M2M service registers identification information for an M2M communication of the first M2M apparatus 10 therein (step S21).

The M2M communication server 30 receives an alias corresponding to the identification information, which is registered in step S21, from the first M2M apparatus 10 or the second M2M apparatus 20, and registers the received alias therein (step S22 and step S23).

The alias registered in steps S22 and S23 may be identification information that is set in the form of a text by a user of the first M2M apparatus 10 or a user of the second M2M apparatus 20 so as to easily recognize the first M2M apparatus 10.

Thereafter, the second M2M apparatus 20 receives text or speech type control information to control the first M2M apparatus 10, by use of the SNS program interface (step S24).

The second M2M apparatus 20 transmits the control information of the first M2M apparatus 10 by use of the alias of the first M2M apparatus 10, and accordingly, the M2M communication server 30 receives the control information (step S25).

In step S25, the second M2M apparatus 20 may receive an alias corresponding to identification information of the first M2M apparatus 10 from the M2M communication server 30, allow an alias to be entered by a user, or allow a previously stored alias to be selected by a user, and then may utilize the alias to transmit the control information.

The M2M communication server 30 having received the control information of the first M2M apparatus 10 from the second M2M apparatus 20 converts the control information into a command recognized by the first M2M apparatus 10 (step S26).

In general, the control information received by the second M2M apparatus 20 through the SNS interface is composed of a format recognized by a human, rather than a format recognized by the first M2M apparatus 10. Accordingly, in step S26, the M2M communication server 30 converts the control information into a command having a format recognized by the first M2M apparatus 10.

The M2M communication server 30 having received the control information in step S25 refers to identification information of the first M2M apparatus 10 corresponding to the alias, by use of the alias that has been used to transmit the control information (step S27).

The identification information of the first M2M apparatus 10 corresponding to the alias may be information that is previously registered and stored in a storage inside the M2M communication server 30.

Depending on embodiments, the conversion at step of S26 and the reference of the identification information at step of S27 may be changed in the order, or may be simultaneously performed.

In this case, the identification information of the first M2M apparatus 10 may include a logical address or a physical address of the first M2M apparatus 10 for an M2M communication.

For example, in a case in which the first M2M apparatus 10 is connected to an additional access point for an M2M communication, identification information of the first M2M apparatus 10 used for the M2M communication may include at least one piece of information of domain information for an M2M communication, an identifier of the access point, information representing a connection scheme of the first M2M apparatus 10 and the access point, and a Media Access Control (MAC) address of the first M2M apparatus 10.

In this case, the access point to which the first M2M apparatus 10 is connected needs to be construed as a concept including various concepts of network access equipment, such as an access point, a router, a gateway, and a repeater.

In addition, in a case in which the first M2M apparatus 10 belongs to a certain terminal, identification information of the first M2M apparatus 10 utilized for an M2M communication may include at least one piece of information of domain information for an M2M communication, an identifier of the terminal, and an identifier of the first M2M apparatus 10. In this case, the identifier of the terminal to which the first M2M apparatus 10 belongs may include information such as an IMEI, an IMSI, an ICCID, an MEID, or an ESN.

The M2M communication server 30 transmits the command, which is converted in step S26, to the first M2M apparatus 10 by use of the identification information of the first M2M apparatus 10 that is referred in step S27 (step S28), and at a later time, receives information corresponding to the command from the first M2M apparatus 10 (step S29).

The information received by the M2M communication server 30 in step S29 may be information that is provided by the first M2M apparatus 10 according to a command instructing to sense a context by use of a sensor, and provide sensed information.

The M2M communication server 30 having received the information corresponding to the command in step S29 converts the information into information that is recognizable through an SNS interface of the second M2M apparatus 20 (step S30), and transmits the converted information to the second M2M apparatus 20 such that the information is output (step S31).

The M2M communication method using an SNS according to some embodiments of the present disclosure may be implemented as program commands that can be executed by various computer systems and be recorded in a computer-readable recording medium. The computer-readable recording medium includes programs, data files, data structures, etc. alone or in combination. The program commands written to the medium are designed or configured especially for the present disclosure, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program command, such as a ROM, a RAM, and a flash memory. Examples of a program command include a premium language code executable by a computer using an interpreter as well as a machine language code generated by a compiler. The hardware device is configured to operate as one or more software modules to implement the present disclosure or vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The detailed description of the preferred embodiments of the present disclosure has been given to enable those skilled in the art to implement and practice the disclosure. Although the disclosure has been described with reference to the various embodiments, those skilled in the art will appreciate that various modifications and variations can be made in the present disclosure without departing from the subject matter, the spirit and scope of the disclosure. Specific terms used in this disclosure and drawings are used for illustrative purposes and not to be considered as limitations of the present disclosure.

What is claimed is:

1. A machine to machine (M2M) communication method using a Social Network Service (SNS), the M2M communication method comprising:

receiving, by an M2M communication server, an alias corresponding to identification information of a first M2M apparatus from the first M2M apparatus or a second M2M apparatus, and registering the received alias therein;

receiving, by the M2M communication server, control information for controlling the first M2M apparatus from the second M2M apparatus that receives the control information through a SNS interface, by use of the received alias;

converting, by the M2M communication server, the control information into a command that is recognizable by the first M2M apparatus, and by referring to the identification information corresponding to the received alias, transmitting the command to the first M2M apparatus by use of the identification information;

receiving, by the M2M communication server, information corresponding to a result of executing the command from the first M2M apparatus; and transmitting the information corresponding to the result of executing the command to the second M2M apparatus, wherein when the first M2M apparatus is connected to an access point, the identification information is set to a format of "a Media Access Control (MAC) address of the first M2M apparatus, a first delimiter, information representing a connection scheme of the first M2M apparatus and the access point, an identifier of the access point, a second delimiter, a domain information for an M2M communication", and wherein when the first M2M apparatus belongs to a terminal, the identification information is set to a format of "an identifier of the first M2M apparatus, a second delimiter, an identifier of the terminal, a first delimiter, a domain information for an M2M communication".

2. The M2M communication method of claim 1, wherein the control information is provided by the second M2M apparatus in the form of a text or a speech.

3. The M2M communication method of claim 1, wherein the identifier of the terminal includes an International Mobile Equipment Identity (IMEI), an International Mobile Subscriber Identity (IMSI), an Integrated Circuit Card Identifier (ICCID), a Mobile Equipment IDentifier (MEID) or an Electronic Serial Number (ESN).

4. The M2M communication method of claim 1, wherein the transmitting the information to the second M2M apparatus comprises:

converting, by the M2M communication server, the received information corresponding to the result of executing the command into information that is recognizable through the SNS interface of the second M2M apparatus, and transmitting the converted information to the second M2M apparatus.

5. The M2M communication method of claim 1, wherein the received alias is provided by the M2M communication server in the form of a text that is visually recognizable.

6. An machine to machine (M2M) communication system using a Social Network Service (SNS), the M2M communication system comprising:

a first M2M apparatus, upon receiving a command by use of identification information of the first M2M apparatus, configured to transmit information corresponding to a result of executing the command;

a second M2M apparatus, upon receiving control information for controlling the first M2M apparatus through a SNS interface, configured to transmit the control information by use of an alias corresponding to the identification information, receive information corresponding to the result of executing the command, and output the received information; and an M2M communication server configured to receive the alias corresponding to the identification information from the first M2M apparatus or the second M2M apparatus, register the received alias, and upon receiving the control information from the second M2M apparatus by use of the received alias, convert the control information into a command that is recognizable by the first M2M apparatus, transmit the command to the first M2M apparatus by use of the identification information in a way to refer to the identification information corresponding to the received alias, receive information corresponding to the result of executing the command from the first M2M apparatus, and transmit the received information to the second M2M apparatus, wherein when the first M2M apparatus is connected to an access point, the identification information is set to a format of "a Media Access Control (MAC) address of the first M2M apparatus, a first delimiter, information representing a connection scheme of the first M2M apparatus and the access point, an identifier of the access point, a second delimiter, a domain information for an M2M communication", and wherein when the first M2M apparatus belongs to a terminal, the identification information is set to a format of "an identifier of the first M2M apparatus, a second delimiter, an identifier of the terminal, a first delimiter, a domain information for an M2M communication".

7. A machine to machine (M2M) communication server using a Social Network Service (SNS), the M2M communication server comprising:

a communication module configured to transmit and receive data;

a registration module configured to register identification information for an M2M communication of a first M2M apparatus and an alias corresponding to the identification information;

a conversion module configured to convert control information for controlling the first M2M apparatus into a command that is recognizable by the first M2M apparatus; and a control module configured to receive the identification information and the alias through the communication module, and control the registration module to register the identification information and the alias, and wherein, in response to the control information received through the communication module by use of the alias from a second M2M apparatus that receives the control information through a SNS interface, the control module is configured to control the conversion module to convert the control information into the command, transmit the command to the first M2M apparatus through the communication module by use of the identification information by referring to the identification information corresponding to the alias in the registration module, receive information corresponding to a result of executing the command from the first M2M apparatus through the communication module, and transmit the received information to the second M2M apparatus, wherein when the first M2M apparatus is connected to an access point, the identification information is set to a format of "a Media Access Control (MAC) address of the first M2M apparatus, a first delimiter, information representing a connection scheme of the first M2M apparatus and the access point, an identifier of the access point, a second delimiter, a domain information for an M2M communication", and wherein when the first M2M apparatus belongs to a terminal, the identification information is set to a format of "an identifier of the first M2M apparatus, a second delimiter, an identifier of the terminal, a first delimiter, a domain information for an M2M communication".

8. The M2M communication server of claim 7, wherein the control information is provided by the second M2M apparatus in the form of a text or a speech.

9. The M2M communication server of claim 7, wherein the identifier of the terminal includes an International Mobile Equipment Identity (IMEI), an International Mobile Subscriber Identity (IMSI), an Integrated Circuit Card IDentifier (ICCID), a Mobile Equipment IDentifier (MEID) or an Electronic Serial Number (ESN).

10. The M2M communication server of 7, wherein the control module is configured to control the conversion module to convert the received information corresponding to the result of executing the command, which has been received from the first M2M apparatus, into information recognizable through the SNS interface of the second M2M apparatus, and transmits the converted information to the second M2M apparatus.

11. The M2M communication server of claim 7, wherein the received alias is provided by the M2M communication server in the form of a text that is visually recognizable.

12. A non-transitory computer readable recording medium that records a program executing the M2M communication method of claim 1.

* * * * *